US009919304B2

(12) United States Patent
Wendland (10) Patent No.: US 9,919,304 B2
(45) Date of Patent: *Mar. 20, 2018

(54) SULFONYL-CONTAINING POLYMERS BASED ON FREE-RADICALLY POLYMERIZABLE SPIROBISINDANE MONOMERS (71) Applicant: 3M INNOVATIVE PROPERTIES COMPANY, St. Paul, MN (US)

(72) Inventor: Michael S. Wendland, North St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/889,581

(22) PCT Filed: Apr. 22, 2014

(86) PCT No.: PCT/US2014/034926
§ 371 (c)(1),
(2) Date: Nov. 6, 2015

(87) PCT Pub. No.: WO2014/186094
PCT Pub. Date: Nov. 20, 2014

(65) Prior Publication Data
US 2016/0089667 A1  Mar. 31, 2016

Related U.S. Application Data (60) Provisional application No. 61/823,148, filed on May 14, 2013.

(51) Int. Cl.
| C08F 12/30 | (2006.01) |
| C07C 13/72 | (2006.01) |
| B01J 39/20 | (2006.01) |
| C08G 75/00 | (2006.01) |
| C08L 81/00 | (2006.01) |
| C08F 12/34 | (2006.01) |
| C08F 212/34 | (2006.01) |
| C08F 8/36 | (2006.01) |
| C08F 8/32 | (2006.01) |
| B01J 39/26 | (2006.01) |
| B01J 41/14 | (2006.01) |
| B01J 41/20 | (2006.01) |

(52) U.S. Cl.
CPC .............. *B01J 39/20* (2013.01); *B01J 39/26* (2013.01); *B01J 41/14* (2013.01); *B01J 41/20* (2013.01); *C08F 8/32* (2013.01); *C08F 8/36* (2013.01); *C08F 12/34* (2013.01); *C08F 212/34* (2013.01); *C08G 75/00* (2013.01); *C08L 81/00* (2013.01); *C08F 12/30* (2013.01); *C08F 2800/10* (2013.01)

(58) Field of Classification Search
USPC .......................................... 544/230; 546/15
See application file for complete search history.

(56) References Cited

U.S. PATENT DOCUMENTS

| 6,080,833 | A | * | 6/2000 | Otsuji | ............... C08F 222/1006 528/196 |
| 7,690,514 | B2 | | 4/2010 | McKeown | |
| 9,056,823 | B2 | * | 6/2015 | Li | ........................ B01J 37/0036 |
| 9,139,674 | B2 | * | 9/2015 | Wendland | .............. B01J 20/267 |
| 9,296,668 | B2 | * | 3/2016 | Wendland | ............... C07C 13/72 |

FOREIGN PATENT DOCUMENTS

| DE | 3434286 | 5/1985 |
| JP | 2000-119420 | 4/2000 |
| JP | 2002-241348 | 8/2002 |
| WO | WO 2005/012397 | 2/2005 |
| WO | WO 2014/186095 | 11/2014 |
| WO | WO 2014/186108 | 11/2014 |

OTHER PUBLICATIONS

Ma, Xiaohua et al. "Synthesis and Gas Transport Properties of Hydroxyl-Functionalized Polyimides with Intrinsic Microporosity", Macromolecules, vol. 45, No. 9, May 8, 2012, pp. 3841-3849.*
Kricheldorf, "Cyclic and Multicyclic Poly(ether sulfone)s by Polycondensation of 5,5',6,6'-Tetrahydroxy-3,3,3',3'-tetramethyl Spirobisindane and 4,4'-Difluorodiphenylsulfone", Journal of Polymer Science Part A: Polymer Chemistry, Dec. 1, 2007, vol. 45, No. 23, pp. 5597-5605.
Budd, "Polymers of intrinsic microporosity (PIMs): robust, solution-processable, organic nonporous materials", Chemical Communications, 2004, pp. 230-231.
Carta, "Novel Spirobisindanes for Use as Precursors to Polymers of Intrinsic Microporosity", Organic Letters, 2008, vol. 10, No. 13, pp. 2641-2643.
Ezzeldin, "Synthesis and Properties of Anion Exchangers Derived from Chloromethyl Styrene Codivinylbenzene and Their Use in Water Treatment", International Journal of Polymer Science, 2010, vol. 2010, 9 pages.

(Continued)

*Primary Examiner* — Mark Kaucher
*Assistant Examiner* — Henry Hu
(74) *Attorney, Agent, or Firm* — Jean A. Lown (57) ABSTRACT

Sulfonyl-containing polymeric materials and methods of making these materials are provided. More specifically, the sulfonyl-containing polymeric materials are prepared by treating a precursor polymeric material with a sulfonyl-containing compound. The precursor polymeric material is formed from a polymerizable composition that contains a free-radically polymerizable spirobisindane monomer. The sulfonyl-containing polymeric material is porous. The size of the pores can be in the microporous region, mesoporous region, or both depending on the particular monomers and reaction conditions used to form the precursor polymeric material.

15 Claims, 2 Drawing Sheets

(56) References Cited

OTHER PUBLICATIONS

Liu, "Efficient and stable solid acid catalysts synthesized from sulfonation of swelling mesoporous polydivinylbenzenes", Journal of Catalysis, 2010, vol. 271, pp. 52-58, XP26980665.
Pepper, "Sulphonated Cross-Linked Polystyrene: A Monofunctional Cation-Exchange Resin", Journal of Applied Chemistry, 1951, vol. 1, No. 3, pp. 124-132.
International Search Report for PCT International Application No. PCT/US2014/034926 dated Aug. 21, 2014, 4 pages.

\* cited by examiner

SULFONYL-CONTAINING POLYMERS BASED ON FREE-RADICALLY POLYMERIZABLE SPIROBISINDANE MONOMERS

CROSS REFERENCE TO RELATED APPLICATIONS

This application is a national stage filing under 35 U.S.C. 371 of PCT/US2014/034926, filed Apr. 22, 2014, which claims priority to U.S. Provisional Application No. 61/823,148, filed May 14, 2013, the disclosure of which is incorporated by reference in its/their entirety herein.

TECHNICAL FIELD

Polymeric materials prepared from free-radically polymerizable spirobisindane monomers are functionalized to provide a sulfonyl-containing group. The resulting sulfonyl-containing polymeric material and a method of making the sulfonyl-containing polymeric material are described.

BACKGROUND

Ion exchange resins used in high pressure chromatography columns are desired that can withstand the relatively high pressures and/or high temperatures typically encountered. Higher pressures can often impart greater separation power. Such ion exchange resins are usually crosslinked to provide resilience to deformation or fracture under high pressure and/or high temperature conditions. For example, many commercially available ion exchange resins for high pressure separations are based on divinylbenzene cross-linked polystyrene that are functionalized to provide ionic groups.

For some applications, it is desirable that the ion exchange resins be porous. Porous materials with micropores (i.e., pores less than 2 nanometers) can be particularly useful for some separations. The micropores can lead to increased capacity, improved kinetics of interaction with charged materials and ions, or both. Porous ion exchange resins have been prepared by the addition of a sulfonic acid group to polymeric materials prepared from divinyl benzene. Such materials are described, for example, in Liu et al., *Journal of Catalysis*, 2010, 271, 52-58. While these materials can contain some micropores, the majority of the pores tend to be in the mesopore range (e.g., 2 to 50 nanometer pore diameter).

Polymeric materials that are porous have been prepared using spirobisindane-containing materials. For example, Reaction Scheme A shows the reaction of 5,5',6,6'-tetrahydroxy-3,3,3',3'-tetramethyl-1,1'-spirobisindane with 2,3,5,6-tetrafluoroterephthalonitrile to form a polymeric material with fused dioxin rings as linking groups. These polymers and their synthesis methods are described more fully, for example, in Budd et al., *Chem. Commun.*, 2004, 230 and in U.S. Pat. No. 7,690,514 (McKeown et al.).

Reaction Scheme A

+

These polymeric materials have a rigid backbone containing regular points of contortion. This characteristic of the backbone results in poor packing of the polymeric chains with each other. The interstitial space between the polymer chains tends to result in microporosity. These polymeric materials are not suitable, however, for applications that require large volumes of material. The polymerization times tend to be lengthy (e.g., several days) and the monomers used to form the polymers are often quite expensive.

SUMMARY

Sulfonyl-containing polymeric materials and methods of making these materials are provided. More specifically, the sulfonyl-containing polymeric materials are prepared by treating a precursor polymeric material with a sulfonyl-containing compound. The precursor polymeric materials are formed from a polymerizable composition that contains a free-radically polymerizable spirobisindane monomer. The sulfonyl-containing polymeric material can be used as an ion exchange resin. Typically, the sulfonyl-containing polymeric material is porous. The pores size can be in the microporous region, mesoporous region, or both depending on the particular monomers and reaction conditions used to form the precursor polymeric material.

In a first aspect, a sulfonyl-containing polymeric material is provided that includes the reaction product of a reaction mixture containing a) a precursor polymeric material and b) a sulfonyl-containing compound. The precursor polymeric material includes a polymerized product of a polymerizable composition containing a monomer of Formula (I).

(I)

In Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond. The sulfonyl-containing polymeric material has at least one group of formula
—$SO_2R^5$ and up to a maximum of one group of formula —$SO_2R^5$ for each aromatic ring in the sulfonyl-containing polymeric material. The group $R^5$ is —OH, —$NH_2$, or —$N(R^6)$-Q-$N(R^6)_2$. The group Q is a single bond, alkylene, or a group of formula -$(Q^1$-$NR^6)_x$-$Q^2$- where each $Q^1$ and $Q^2$ is independently an alkylene and where x is an integer in a range of 1 to 4. Each group $R^6$ is independently hydrogen or alkyl.

In a second aspect, a method of making a sulfonyl-containing polymeric material is provided. The method includes forming a polymerizable composition containing a monomer of Formula (I) as described above, preparing a precursor polymeric material by reacting the polymerizable composition and then treating the precursor polymeric material with a sulfonyl-containing compound to form the sulfonyl-containing polymeric material. The sulfonyl-containing polymeric material has at least one group of formula —$SO_2R^5$ and up to a maximum of one group of formula —$SO_2R^5$ for each aromatic ring in the sulfonyl-containing polymeric material. The group $R^5$ is the same as defined above.

DETAILED DESCRIPTION

Figure 1:
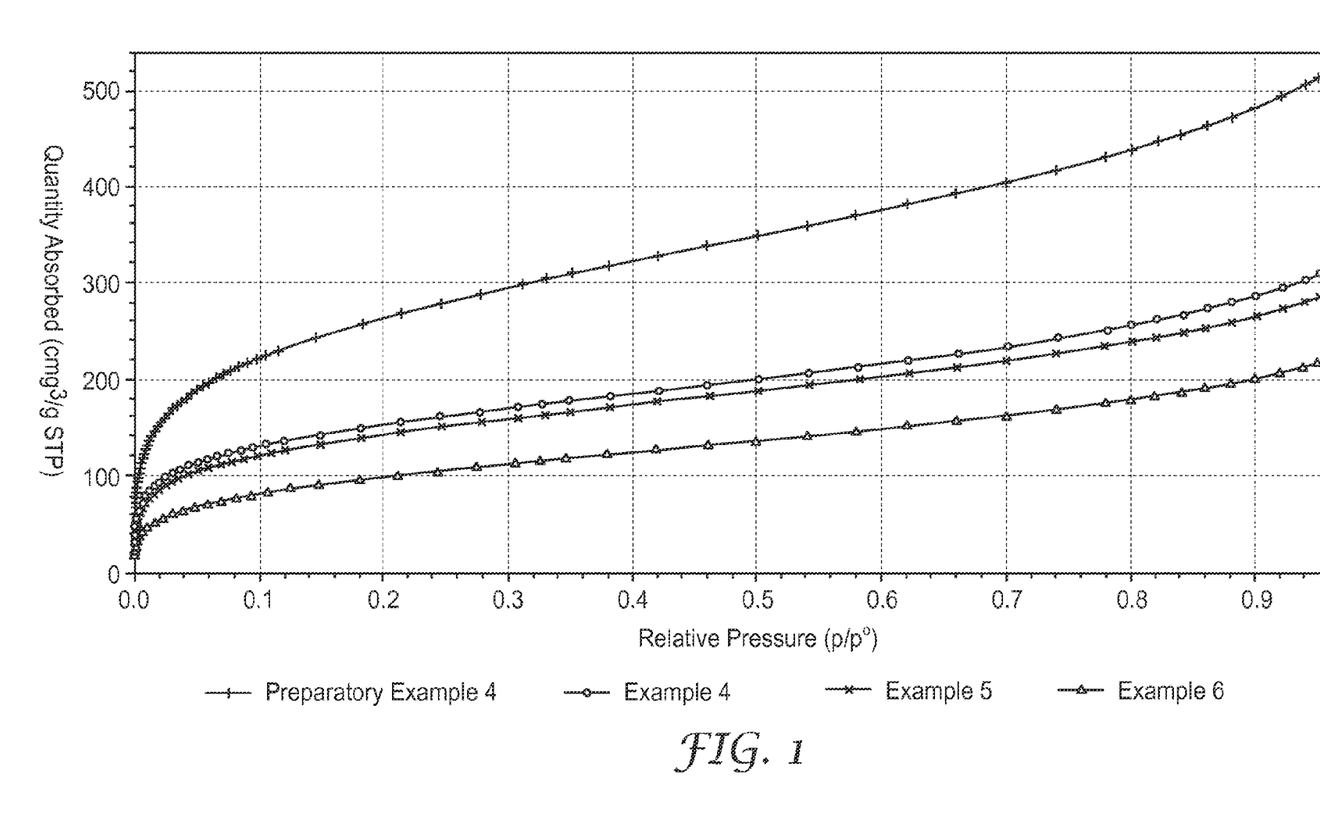
FIG. 1 is the plot of the argon adsorption isotherm at 77° K for Preparatory Example 4 and Examples 4-6.
Figure 2:
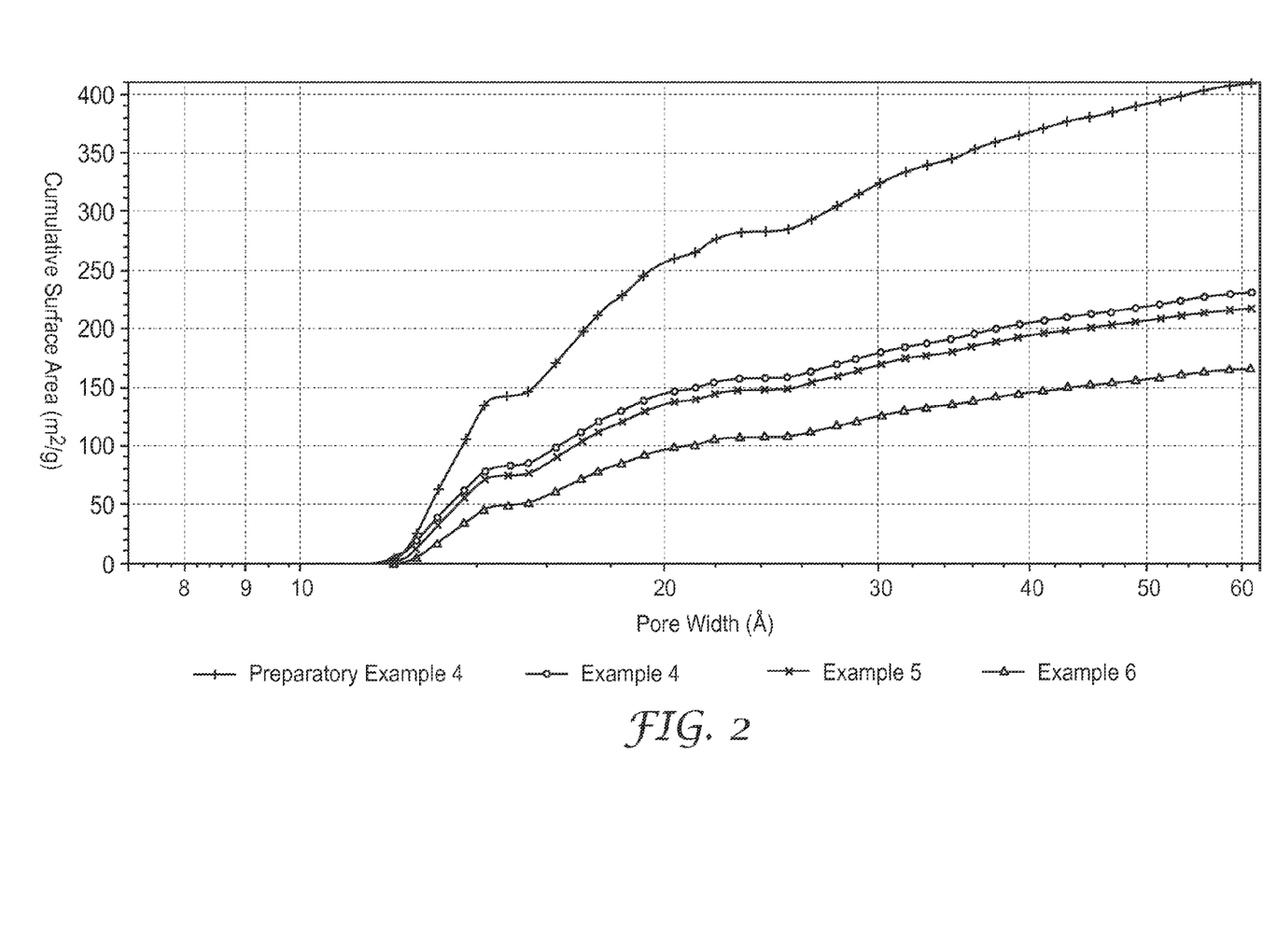
FIG. 2 is a plot of cumulative surface area versus pore width for Preparatory Example 4 and Examples 4-6.

Sulfonyl-containing polymeric materials are prepared by treating a precursor polymeric material with a sulfonyl-containing compound. The precursor polymeric materials are formed from a polymerizable composition that contains a free-radically polymerizable spirobisindane monomer. The sulfonyl-containing polymeric material, which is often porous, can be used as an ion exchange resin.

The terms "a", "an", and "the" are used interchangeably with "at least one" to mean one or more of the elements being described.

The term "halo" refers to a monovalent group that is a radical of a halogen atom. The halo can be fluoro, chloro, bromo, or iodo.

The term "alkyl" refers to a monovalent group that is a radical of an alkane. The alkyl group can have 1 to 20 carbon atoms. The alkyl group can be linear, branched, cyclic, or a combination thereof. When the alkyl is linear, it can have 1 to 20 carbon atoms. When the alkyl is branched or cyclic, it can have 3 to 20 carbon atoms.

The term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group usually has 5 to 20 carbon atoms or 6 to 10 carbon atoms.

The term "alkaryl" refers to an aryl group substituted with at least one alkyl group. The alkaryl group contains 6 to 40 carbon atoms. The alkaryl group often contains an aryl group having 5 to 20 carbon atoms and an alkyl group having 1 to 20 carbon atoms.

The term "aralkyl" refers to an alkyl group substituted with at least one aryl group. The aralkyl group contains 6 to 40 carbon atoms. The aralkyl group often contains an alkyl group having 1 to 20 carbon atoms and an aryl group having 5 to 20 carbon atoms.

The term "carbocyclic group" refers to an aliphatic or aromatic carbon ring structure. The carbocyclic group can be saturated, partially unsaturated, or unsaturated. The carbocyclic group often contains 5 to 20 carbon atoms.

The term "polymer" refers to both polymeric materials prepared from one monomer such as a homopolymer or to polymeric materials prepared from two or more monomers such as a copolymer, terpolymer, or the like. Likewise, the term "polymerize" refers to the process of making a polymeric material that can be a homopolymer, copolymer, terpolymer, or the like.

The term "mircopores" refers to pores having a diameter less than 2 nanometers.

The term "mesopores" refers to pores having a diameter in a range of 2 to 50 nanometers.

The term "macropores" refers to pores having a diameter greater than 50 nanometers.

The sulfonyl-containing polymeric material is prepared by treating a precursor polymeric material with a sulfonyl-containing compound. The precursor polymeric material includes a polymerized product of a polymerizable composition containing a monomer of Formula (I).

In Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond.

Each $R^1$ in Formula (I) is hydrogen, halo, alkyl, aryl, alkaryl, or aralkyl. Suitable halo groups for $R^1$ include, but are not limited to, chloro and bromo. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl.

At least one $R^1$ is hydrogen in the monomer of Formula (I). In some embodiments, there is at least one $R^1$ equal to hydrogen on each aromatic ring shown in Formula (I). That is, there are at least two $R^1$ groups equal to hydrogen in the monomer of Formula (I). This is often the position that undergoes a reaction with the sulfonyl-containing compound to introduce a group of formula $-SO_2R^5$ into the precursor polymeric material during the formation of the sulfonyl-containing polymeric material. That is, in the final sulfonyl-containing polymeric material, one of the $R^1$ groups equal to hydrogen in the precursor polymeric material prepared from the monomer of Formula (I) is replaced with a sulfonyl-containing group of formula $-SO_2R^5$.

Each $R^2$ in Formula (I) is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl.

Suitable cyclic alkyl groups that form through the combination of $R^2$ and $R^3$ can have up to 10 carbon atoms, up to 8 carbon atoms, or up to 6 carbon atoms. In many embodiments, the cyclic alkyl group has 3 to 8 carbon atoms or 3 to 6 carbon atoms. The cyclic alkyl group can optionally be fused to one or more carbocyclic rings. Each carbocyclic ring typically has up to 10 carbon atoms, up to 8 carbon atoms, or up to 6 carbon atoms and can be aromatic (i.e., unsaturated), partially unsaturated, or saturated. The fused carbocyclic rings are often benzene rings. An example cyclic alkyl with one or more fused carbocyclic rings is fluorenyl (i.e., a monovalent radical of fluorene).

Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to adjacent carbon atom to form a carbon-carbon bond. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl. Suitable cyclic alkyl groups that form through the combination of $R^2$ and $R^3$ can have up to 10 carbon atoms, up to 8 carbon atoms, or up to 6 carbon atoms. In many embodiments, the cyclic alkyl group has 3 to 8 carbon atoms or 3 to 6 carbon atoms. The cyclic alkyl group can optionally be fused to one or more carbocyclic rings. Each carbocyclic ring typically has up to 10 carbon atoms, up to 8 carbon atoms, or up to 6 carbon atoms and can be aromatic (i.e., unsaturated), partially unsaturated, or saturated. The fused carbocyclic rings are often benzene rings. An example cyclic alkyl with one or more fused carbocyclic rings is fluorenyl (i.e., a monovalent radical of fluorene).

Each $R^4$ is independently hydrogen or combines with $R^3$ connected to an adjacent carbon atom to form a carbon-carbon bond.

In some specific embodiments of the monomer of Formula (I), $R^1$ is hydrogen or halo, $R^2$ is an alkyl having 1 to 10 carbon atoms (e.g., 1 to 6 carbon atoms, 1 to 4 carbon atoms, 1 to 3 carbon atoms, or 1 carbon atom), $R^3$ is an alkyl having 1 to 10 carbon atoms (e.g., 1 to 6 carbon atoms, 1 to 4 carbon atoms, 1 to 3 carbon atoms, or 1 carbon atom), and $R^4$ is hydrogen. In other more specific embodiments of the monomer of Formula (I), each $R^1$ is hydrogen, $R^2$ is an alkyl having 1 to 6 carbon atoms (e.g., 1 to 4 carbon atoms, 1 to 3 carbon atoms, or 1 carbon atom), $R^3$ is an alkyl having 1 to 6 carbon atoms (e.g., 1 to 4 carbon atoms, 1 to 3 carbon atoms, or 1 carbon atom), and $R^4$ is hydrogen. In an even more specific embodiment of the monomer of Formula (I), each $R^1$ is hydrogen, $R^2$ is methyl, $R^3$ is methyl, and $R^4$ is hydrogen; this monomer is 3,3,3',3'-tetramethyl-1,1'-spiro-bisindan-6,6'-divinyl.

The monomers of Formula (I) can be prepared using any known method. For example, monomers can be prepared as shown in Reaction Scheme B where all of the $R^1$ and $R^4$ groups are hydrogen and where all of the $R^2$ and $R^3$ groups are alkyl or hydrogen.

A bisphenol compound of Formula (II) is reacted with methane sulfonic acid (MSA) to produce the spirobisindan-6,6'-diol compound of Formula (III). The spirobisindan-6,6'-diol can be reacted with trifluoromethane sulfonic anhydride (TFMSA) in the presence of pyridine and a solvent such as methylene chloride to produce the spirobisindan-6,6'-bistriflate compound of Formula (IV). The spirobisindan-6,6'-bistriflate compound can subsequently be subjected to a Stille coupling reaction to produce the spirobisindane-6,6'-divinyl compound of Formula (V). That is, the compound of Formula (IV) can be reacted with tributyl(vinyl) tin in the presence of lithium chloride, a palladium catalyst, and a solvent such as N,N-dimethyl formamide (DMF) to introduce polymerizable groups. The details for this synthesis approach are further described in the Example section for the preparation of the monomer 3,3,3',3'-tetramethyl-1,1'-spirobisindan-6,6'-divinyl starting from bisphenol A as the compound of Formula (II).

Monomers of Formula (I) can be prepared as shown in Reaction Scheme C where $R^3$ and $R^4$ combine to form a carbon-carbon double bond and where $R^2$ is an alkyl, aryl, alkaryl, or aralkyl.

The chemistry involved in the formation of the dione (Compound (VII)) is described in *Org. Lett.*, 2008, 10, 2641. More specifically, diethyl-1,3-acetonedicarboxylate and methoxybenzene are reacted in the presence of sulfuric acid to form Compound (VI). This reaction is followed by hydrolysis and then Friedel-Crafts acylation mediated by polyphosphoric acid (PPA) and aluminum trichloride (AlCl$_3$) to form Compound (VII). Various monomers of Formula (I) can be prepared from the dione (Compound (VII)) using Grignard reactions. This type of reaction is exemplified in Reaction Scheme C using R$^2$MgBr as the Grignard reagent. The dehydrated spirobisindane (Compound (VIII)) is formed after treatment with aqueous sulfuric acid. Compound (VIII) is reacted with boron tribromide (BBr$_3$) to convert the methoxy groups to hydroxyl groups. The hydroxyl groups are then reacted with trifluoromethane sulfonic anhydride (TFMSA) in the presence of pyridine and a solvent such as methylene chloride to produce Compound (IX) with triflate groups. The triflate groups are reacted with tributyl(vinyl) tin in the presence of lithium chloride, a palladium catalyst, and a solvent such as N,N-dimethyl formamide (DMF). This reaction, which is often referred to as a Stille coupling reaction, introduces the polymerizable groups as shown in Compound (X).

The polymerizable composition used to prepare the precursor polymeric material includes at least a monomer of Formula (I). In some embodiments, the only monomer in the polymerizable composition is of Formula (I) and the precursor polymeric material is a homopolymer. In other embodiments, the polymerizable composition includes a monomer of Formula (I) and at least one co-monomer that is not of Formula (I). Such a precursor polymeric material is a copolymer.

The co-monomers are often selected to prepare a precursor polymeric material that is porous. In some embodiments, the co-monomers include one or more polyvinyl aromatic monomers. The term "polyvinyl aromatic monomer" refers to a monomer that is not of Formula (I) and that has a plurality (e.g., two or three) of vinyl groups that are each bonded to an aromatic carbocyclic group. The aromatic carbocyclic group has at least one aromatic carbocyclic ring and can have 1 to 5 optional rings that are connected to or fused to the aromatic carbocyclic ring. The additional rings can be aromatic, aliphatic, or a combination thereof. Any of the rings optionally can be substituted with one or more alkyl groups. The aromatic carbocyclic group usually has 5 to 20 carbon atoms, 6 to 20 carbon atoms, or 6 to 10 carbon atoms. The polyvinyl aromatic monomer is often a divinyl aromatic monomer (e.g., divinylbenzene or divinylbenzene substituted with one or more alkyl groups) or a trivinyl aromatic monomer (e.g., trivinylbenzene or trivinylbenzene substituted with one or more alkyl groups).

The polymerizable compositions often contain at least 1 weight percent, at least 5 weight percent, at least 10 weight percent, at least 20 weight percent, at least 30 weight percent, at least 40 weight percent, or at least 50 weight percent of a monomer of Formula (I). For the preparation of polymeric material with micropores, the polymerizable composition often contains at least 40 weight percent, at least 50 weight percent, at least 60 weight percent, at least 70 weight percent, at least 80 weight percent, or at least 90 weight percent of the monomer of Formula (I).

In some embodiments, the polymerizable composition can include 1 to 99 weight percent of a monomer of Formula (I) and 1 to 99 weight percent of a polyvinyl aromatic monomer. For example, the polymerizable composition can contain 10 to 90 weight percent of a monomer of Formula (I) and 10 to 90 weight percent of a polyvinyl aromatic monomer, 20 to 80 weight percent of a monomer of Formula (I) and 20 to 80 weight percent of a polyvinyl aromatic monomer, 30 to 70 weight percent of a monomer of Formula (I) and 30 to 70 weight percent of a polyvinyl aromatic monomer, or 40 to 60 weight percent of a monomer of Formula (I) and 40 to 60 weight percent of a polyvinyl aromatic monomer. The weight percent is based on a total weight of monomers in the polymerizable composition.

In other embodiments, the polymerizable composition can include 50 to 99 weight percent of a monomer of Formula (I) and 1 to 50 weight percent of a polyvinyl aromatic monomer. For example, the polymerizable composition can contain 60 to 99 weight percent of a monomer of Formula (I) and 1 to 40 weight percent of a polyvinyl aromatic monomer, 70 to 99 weight percent of a monomer of Formula (I) and 1 to 30 weight percent of a polyvinyl aromatic monomer, 80 to 99 weight percent of a monomer of Formula (I) and 1 to 20 weight percent of a polyvinyl aromatic monomer, or 90 to 99 weight percent of a monomer of Formula (I) and 1 to 10 weight percent of a polyvinyl aromatic monomer. The weight percent is based on a total weight of monomers in the polymerizable composition.

Some polyvinyl aromatic monomers contain one or more mono-vinyl aromatic monomers as impurities. As used herein, the term "mono-vinyl aromatic monomer" refers to a monomer having a single vinyl group bonded to an aromatic carbocyclic group. The aromatic carbocyclic group has at least one aromatic carbocyclic ring and can have 1 to 5 optional rings that are connected to or fused to the aromatic carbocyclic ring. The additional rings can be aromatic, aliphatic, or a combination thereof. Any of the rings optionally can be substituted with one or more alkyl groups. The aromatic carbocyclic group usually has 5 to 20 carbon atoms, 6 to 20 carbon atoms, or 6 to 10 carbon atoms. Example mono-vinyl aromatic monomers include, but are not limited to, styrene, ethyl styrene, and the like.

In some embodiments, the polyvinyl aromatic monomer contains up to 25 weight percent, up 20 weight percent, up to 15 weight percent, up to 10 weight percent, or up to 5 weight percent mono-vinyl aromatic monomer. For example, technical grade divinylbenzene typically contains about 20 weight percent ethyl styrene. The weight percent is based on a total weight of the mono-vinyl aromatic monomer and the polyvinyl aromatic monomer.

Considering impurities that may be present in the polyvinyl aromatic monomers, the polymerizable compositions often contain 1 to 99 weight percent of a monomer of Formula (I), 0 to 25 weight percent of mono-vinyl aromatic monomer, and 1 to 99 weight percent of a polyvinyl aromatic monomer. In another example, the polymerizable composition contains 1 to 98 weight percent of a monomer of Formula (I), 1 to 20 weight percent of a mono-vinyl aromatic monomer, and 1 to 98 weight percent of a polyvinyl aromatic monomer. In yet another example, the polymerizable composition contains 5 to 90 weight percent of a monomer of Formula (I), 5 to 19 weight percent of a mono-vinyl aromatic monomer, and 5 to 90 weight percent of a polyvinyl aromatic monomer. If polymeric material that is porous is desired, the amount of mono-vinyl aromatic monomer is typically selected to be less than 15 weight percent, less than 10 weight percent, or less than 5 weight percent and often additionally contains at least 50 weight percent of a monomer of Formula (I). The weight percent is based on a total weight of monomer in the polymerizable composition.

In some embodiments, a polymeric material that is microporous is desired. To prepare microporous polymeric material, the polymerizable composition often contains 40 to 99 weight percent of a monomer of Formula (I), 0 to 15 weight percent of a mono-vinyl aromatic monomer, and 1 to 60 weight percent of a polyvinyl aromatic monomer. For example, the polymerizable composition contains 50 to 99 weight percent of a monomer of Formula (I), 0 to 10 weight percent of a mono-vinyl aromatic monomer, and 1 to 50 weight percent of a polyvinyl aromatic monomer. In another example, the polymerizable composition contains 60 to 99 weight percent of a monomer of Formula (I), 0 to 10 weight percent of a mono-vinyl aromatic monomer, and 1 to 40 weight percent of a polyvinyl aromatic monomer. In yet another example, the polymerizable composition contains 70 to 99 weight percent of a monomer of Formula (I), 0 to 10 weight percent of a mono-vinyl aromatic monomer, and 1 to 30 weight percent of a polyvinyl aromatic monomer. The weight percent is based on a total weight of monomer in the polymerizable composition.

In addition to the various monomers, the polymerizable compositions typically include an initiator for free radical polymerization reactions. Any suitable free radical initiator can be used. In some embodiments, the free radical initiator is a thermal initiator that is usually activated at a temperature above room temperature. In other embodiments, the free radical initiator is a redox initiator. Suitable free radical initiators are typically selected to be miscible with the monomers included in the polymerizable composition. The free radical initiator is typically present in an amount in a range of 0.05 to 10 weight percent, in a range of 0.05 to 5 weight percent, in a range of 0.05 to 2 weight percent, in a range of 0.05 to 1 weight percent, in a range of 0.1 to 5 weight percent, in a range of 0.2 to 5 weight percent, in a range of 0.5 to 5 weight percent, in a range of 0.1 to 2 weight percent, or in a range of 0.1 to 1 weight percent. The weight percent is based on a total weight of monomer in the polymerizable composition. Both the type and amount of initiator can affect the polymerization rate, which in turn can influence the formation of porous polymeric material.

Suitable thermal initiators include, but are not limited to, organic peroxides and azo compounds. Example azo compounds include, but are not limited to, those commercially available under the trade designation VAZO from E.I. du Pont de Nemours Co. (Wilmington, Del.) such as VAZO 64 (2,2'-azobis(isobutyronitrile), which is often referred to as AIBN) and VAZO 52 (2,2'-azobis(2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tert-butyl peroxide, and mixtures thereof. The temperature needed to activate the thermal imitator is often in a range of 25° C. to 160° C., 30° C. to 160° C., or 40° C. to 160° C.

Suitable redox initiators include arylsulfinate salts or triarylsulfonium salts in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and tetrabutylammonium 3-trifluoromethylbenzenesulfinate. Specific triarylsulfonium salts include those with a triphenylsulfonium cation and with an anion selected from $PF_6^-$, $AsF_6^-$, and $SbF_6^-$. Suitable metal ions include, for example, ions of group III metals, transition metals, and lanthanide metals. Specific metal ions include, but are not limited to, Fe(III), Co(III), Ag(I), Ag(II), Cu(II), Ce(III), Al(III), Mo(VI), and Zn(II). Suitable peroxides include benzoyl peroxide, lauroyl peroxide, and the like. Suitable persulfates include, for example, ammonium persulfate, tetraalkylammonium persulfate (e.g., tetrabutylammonium persulfate), and the like.

The polymerizable composition typically also includes a solvent. Any suitable solvent or mixture of solvents can be selected. The one or more solvents are typically selected to be miscible with the monomers included in the polymerizable composition. Stated differently, the monomers in the polymerizable composition are typically dissolved in one or more solvents. Additionally, the selection of the one or more solvents can alter the porosity of the precursor polymeric material formed from the polymerizable composition. The porosity can often be increased by delaying the onset of phase separation of the growing polymeric chains during the polymerization process. That is, the use of solvents with good solubility for both the monomers and the growing polymeric material tends to enhance porosity. Solubility parameter calculations can be used to select a solvent or solvent mixture that is close to that of the polymeric material. Solvents that tend to enhance porosity include, but are not limited to, ethyl acetate, amyl acetate (i.e., n-pentyl acetate), and methyl ethyl ketone.

The onset of phase separation of the growing polymeric chains also can be delayed by reducing the rate of polymerization. The rate can be reduced by using a lower polymerization temperature and selecting an initiator that is activated at a lower temperature. The amount of the initiator added to the polymerizable composition can also influence the rate of reaction. That is, the reaction rate is typically increased with the addition of higher amounts of the initiator.

Additionally, the percent solids of the polymerizable composition can influence the rate of polymerization. Typically, lower percent solids tend to favor porosity. The percent solids are often in a range of 0.5 to 50 weight percent, 1 to 40 weight percent, 1 to 30 weight percent, 1 to 20 weight percent, 1 to 15 weight percent, 1 to 10 weight percent, 1 to 6 weight percent, or 2 to 6 weight percent based on a total weight of the polymerizable composition.

Other types of polymerization methods can be used, if desired, such as, for example, emulsion polymerization methods and suspension polymerization methods. If porous polymeric material is desired, the polymerizable compositions and reaction conditions can be selected using the principles discussed above.

The polymerized product, which is the precursor polymeric material, can be a monolith that can be easily broken apart for washing to remove any residual monomer. The washed product can be dried to form a powder. Alternatively, if suspension polymerization or emulsion polymerization methods are used, the polymerized product can be in the form of beads or particles.

The precursor polymeric material can be porous. The porosity can be characterized from adsorption isotherms obtained at various partial pressures (e.g., $10^{-6}$ to 0.98) using nitrogen or argon as the sorbate under cryogenic conditions. The total porosity can be calculated based on the total amount of nitrogen adsorbed at a relative pressure close to 0.95 or higher. The total porosity is often at least 0.20 $cm^3/gram$, at least 0.30 $cm^3/gram$, at least 0.40 $cm^3/gram$, or at least 0.45 $cm^3/gram$. The total porosity can be, for example, up to 1.2 $cm^3/gram$ or higher, up to 1.1 $cm^3/gram$, up to 1.0 $cm^3/gram$, up to 0.95 $cm^3/gram$, or up to 0.90 $cm^3/gram$.

The total porosity and the pore size distribution of the precursor polymeric material can be varied by choice of monomers in the polymerizable composition and the reaction conditions such as solvent selection, the percent solids of the polymerizable composition, and the polymerization rate. In many embodiments, the porous polymeric material is microporous, mesoporous, or both. Homopolymers prepared from polymerizable compositions containing a monomer of Formula (I) tend to be microporous. Depending on the specific reaction conditions, the porosity can be predominately microporous. Various polyvinyl aromatic monomers that are not of Formula (I) can be added to the polymerizable composition to prepare precursor polymeric material having both micropores and mesopores. As the amount of the polyvinyl aromatic monomer is increased relative to the monomer of Formula (I), the percentage of the total porosity attributable to micropores tends to decrease.

For some applications, precursor polymeric material having a porosity that is mainly microporous can be advantageous. Micropores tend to increase the ion exchange capacity of the sulfonyl-containing materials (e.g., more ionic or charged materials can be adsorbed on the ion exchange resins), tend to improve the kinetics of adsorption (e.g., ionic or charged materials can be adsorbed faster or more efficiently on the ion exchange resins), or both.

The total surface area can be calculated from BET (Brunauer-Emmett, and Teller) analysis of the isotherm data at relative pressures less than 0.35, less than 0.30, less than 0.25, or less than 0.20. The total surface area is often at least 100 $m^2/gram$, at least 200 $m^2/gram$, at least 400 $m^2/gram$, or at least 600 $m^2/gram$. The total surface area of the precursor polymeric material can be, for example, up to 1000 $m^2/gram$ or higher, up to 900 $m^2/gram$, up to 850 $m^2/gram$, or up to 800 $m^2/gram$.

The precursor polymeric material is subsequently treated with a sulfonyl-containing compound. This reaction results in the addition of a sulfonyl-containing group of formula —$SO_2R^5$ to the precursor polymeric material and the formation of a sulfonyl-containing polymeric material. The sulfonyl-containing group typically replaces a hydrogen atom that is bonded to a carbon atom that is part of an aromatic ring of the precursor polymer. For example, the sulfonyl-containing group often replaces a $R^1$ group that is equal to hydrogen in the precursor polymer. Alternatively or additionally, the sulfonyl-containing group can replace a hydrogen atom that is bonded to a carbon atom in any aryl group, in the aryl portion of any aralkyl group, or in the aryl portion of any alkaryl group in the precursor polymeric material. Further, the sulfonyl-containing group can be added to a double bond in the precursor polymeric material where groups $R^3$ and $R^4$ combine to form a carbon-carbon double bond. At least one aromatic ring in the sulfonyl-containing polymeric material contains a sulfonyl-containing group. Typically, the sulfonyl-containing polymeric material has a maximum number of sulfonyl-containing groups equal to the total number of aromatic rings. There are usually no more than one sulfonyl-containing groups per aromatic ring in the sulfonyl-containing polymeric material.

The sulfonyl-containing group is of formula —$SO_2R^5$, where the group $R^5$ is —OH, —$NH_2$, or —$N(R^6)$-Q-$N(R^6)_2$. Any of these $R^5$ can be in the form of a salt depending on the pH conditions. Suitable cations for salts include, but are not limited to, alkali metals, alkaline earth metals, ammonium ions, or tetraalkylammonium ions. Suitable anions for salts include, but are not limited to, halides, sulfates, phosphates, nitrates, and carboxylates (e.g., acetate).

In some embodiments, the sulfonyl-containing group is of formula —$SO_2OH$ or a salt of the conjugate base (the anion is —$SO_3^{-1}$). In other embodiments, the sulfonyl-containing group is of formula —$SO_2NH_2$ or a salt of the conjugate acid (the cation is —$SO_2NH_3^{+1}$). In still other embodiments, the sulfonyl-containing group is of formula —$SO_2NR^6$-Q-N$(R^6)_2$ or the salt of the conjugate acid. Each group $R^6$ is independently hydrogen or alkyl. Suitable $R^6$ alkyl groups often have 1 to 10 carbon atoms, 1 to 6 carbon atoms, 1 to 4 carbon atoms, or 1 to 3 carbon atoms. In many examples, $R^6$ alkyl groups are methyl or ethyl. The group Q is a single bond, alkylene, or a group of formula -($Q^1$-$NR^6$)$_x$-$Q^2$- where each $Q^1$ and $Q^2$ is independently an alkylene and where x is an integer in a range of 1 to 4. Suitable alkylene groups for Q, $Q^1$, and $Q^2$ often have 1 to 10 carbon atoms, 1 to 6 carbon atoms, 1 to 4 carbon atoms, or 1 to 3 carbon atoms. If Q is a single bond, the sulfonyl group has a hydrazinyl group (i.e., —NH—$N(R^6)_2$, which is often —NH—$NH_2$). The variable x in the formula -($Q^1$-$NR^6$)$_x$-$Q^2$- is usually an integer in a range of 1 to 4, 1 to 3, or 1 to 2.

Any known method can be used to introduce the sulfonyl-containing group into the precursor polymeric material. That is, the precursor can be reacted with any known sulfonyl-containing compound. The formation of the specific —$SO_2R^5$ group often includes reacting the precursor with a sulfonyl-containing compound and then further reacting the intermediate polymeric material with another compound such as water, ammonia, ammonium hydroxide, a polylamine, or hydrazine. The term "polyamine" refers to a compound having at least two amino groups of formula —$N(R^6)_2$ where $R^6$ is the same as defined above. The polyamine is often of formula $NH(R^6)$-Q-$N(R^6)$.

In some embodiments, the precursor polymeric material is reacted with a halogenated sulfonic acid (e.g., chlorosulfonic acid) as the sulfonyl-containing compound. The precursor polymeric material is mixed with a solution of the halogenated sulfonic acid dissolved in an appropriate organic solvent. Suitable organic solvents include various halogenated solvents such as 1,2-dichloroethane, methylene chloride, and chloroform. The solution of the halogenated sulfonic acid is often added to the precursor polymeric material at a temperature below room temperature such as, for example, at about 0° C. The initial reaction can be quite exothermic so, if adequate care is not taken, the solvent can boil during the addition. After the reactants are combined, the temperature is often increased to any desired temperature such as room temperature up to the temperature associated with reflux conditions. The reaction time can range from a few minutes to 24 hours. The reaction time and the reaction temperature can be varied to prepare polymeric materials with different amounts of the sulfonyl-containing group. After this reaction, the sulfonyl-containing polymeric material has attached —$SO_2X$ groups where X is halo such as chloro. These groups are typically reacted further to provide a group of formula —$SO_2R^5$. To prepare the group —$SO_2OH$, the intermediate polymeric material with attached —$SO_2X$ group is placed in water. The conversion of the —$SO_2X$ groups to —$SO_2OH$ groups often can occur at room temperature within 30 minutes, within 1 hour, within 2 hours, within 4 hours, within 8 hours, within 12 hours, within 24 hours, within 36 hours, within 48 hours, within 60 hours, or within 72 hours.

In other embodiments, the precursor polymeric material is reacted with concentrated sulfuric acid or with concentrated sulfuric acid in the presence of a catalyst such as silver sulfate. When a catalyst is present, the reaction typically proceeds faster. With or without the catalyst, the reaction temperature is often in a range of room temperature (e.g., 20-25° C.) to 150° C., in a range of room temperature to 125° C., or in a range of room temperature to 100° C. The reaction times can vary from a few minutes (e.g., 5 minutes, 10 minutes, or 30 minutes) to 24 hours or longer. As with halogenated sulfonic acid, the reaction time and the reaction temperature can be varied to prepare polymeric materials with different amounts of the sulfonyl-containing group. After this reaction, the sulfonyl containing polymeric material has attached —$SO_2OH$ groups.

Typically, it is desirable to introduce as many sulfonyl-containing groups as possible into the precursor polymeric material. An excess of the sulfonyl-containing compound is used. That is, the moles of sulfonyl-containing compound can be up to 10 times the number of moles of aromatic rings in the precursor polymeric material. If it is desirable to have fewer sulfonyl-containing groups, the moles of sulfonyl-containing compound can be lowered, the reaction time can be shortened, or the reaction temperature can be lowered. For example, in some embodiments, there is not a sulfonyl group on each aromatic ring and the molar ratio of sulfonyl-containing compound to aromatic rings is less than 1.

To prepare —$SO_2NH_2$ groups, a sulfonyl-containing intermediate polymeric material having —$SO_2X$ groups (prepared using a halogenated sulfonic acid as described above) can be treated with ammonia gas or ammonium hydroxide. To maximize conversion of the —$SO_2X$ groups to —$SO_2NH_2$ groups, the moles of ammonia or ammonium hydroxide are often as much as 10 times the number of moles of —$SO_2X$ groups. This reaction typically often occurs at room temperature within 30 minutes, within 1 hour, within 2 hours, within 4 hours, within 8 hours, within 12 hours, within 24 hours, within 36 hours, within 48 hours, within 60 hours, or within 72 hours. The reaction temperature is often in a range from room temperature to the temperature associated with reflux conditions.

To prepare —$SO_2NH$—$NH_2$ groups, a sulfonyl-containing intermediate polymeric material having —$SO_2X$ groups (prepared using a halogenated sulfonic acid as described above) can be treated with hydrazine. Either hydrazine monohydrate or anhydrous hydrazine can be dissolved in an organic solvent. To maximize conversion of the —$SO_2X$ groups to —$SO_2NH$—$NH_2$ groups, the moles of hydrazine are often as much as 10 times the number of moles of —$SO_2X$ groups. This reaction typically often occurs at room temperature within 30 minutes, within 1 hour, within 2 hours, within 4 hours, within 8 hours, within 12 hours, within 24 hours, within 36 hours, within 48 hours, within 60 hours, or within 72 hours. The reaction temperature is often in a range from room temperature to the temperature associated with reflux conditions. Anhydrous conditions or organic solvents are often selected in place of water to minimize the preparation of —$SO_2OH$ groups.

To prepare —$SO_2NR^6$-Q-$N(R^6)_2$ where Q is a group of formula -($Q^1$-$NR^6$)$_x$-$Q^2$-, a sulfonyl-containing intermediate polymeric material having —$SO_2X$ groups (prepared using a halogenated sulfonic acid as described above) can be treated with an amino-containing compounds of formula ($R^6$)HN-Q-$N(R^6)_2$ (e.g., ($R^6$)HN-($Q^1$-$NR^6$)$_x$-$Q^2N(R^6)_2$). Suitable examples of these compounds include, but are not limited to, ethylene diamine, diethylenetriamine, triethylenetetramine, tetraethylenepentamine, and the like. To maximize conversion of the —$SO_2X$ groups to —$SO_2NR^6$-Q-N($R^6$)$_2$ groups, the moles of reactive amino-containing groups are often at much as 10 times the number of moles of —$SO_2X$ groups. This reaction typically often occurs at room temperature within 30 minutes, within 1 hour, within 2 hours, within 4 hours, within 8 hours, within 12 hours, within 24 hours, within 36 hours, within 48 hours, within 60 hours, or within 72 hours. The reaction temperature is often in a range from room temperature to the temperature associated with reflux conditions. Anhydrous conditions or organic solvents are often selected in place of water to minimize the preparation of —$SO_2OH$ groups.

The sulfonyl-containing polymeric material typically contains at least 0.2 milliequivalents of —$SO_2R^5$ per gram. In some embodiments, the amount of —$SO_2R^5$ is in a range of 0.2 to 7 milliequivalents per gram, in a range of 0.2 to 6 milliequivalents per gram, in a range of 0.2 to 5 milliequivalents per gram, in a range of 0.2 to 4.5 milliequivalents per gram, in a range of 0.5 to 4 milliequivalents per gram, in a range of 1 to 4 milliequivalents per gram, in a range of 2 to 4 milliequivalents per gram, or in a range of 3 to 4 milliquivalents per gram of the sulfonyl-containing polymeric material. Any suitable method can be used to determine the milliequivalents per gram. In one preferred method, the total sulfur content of the sulfonyl-containing polymeric material is determined by elemental analysis.

In some embodiments, the sulfonyl-containing polymeric material has —SO$_2$OH groups or a salt thereof and can be used as an ion exchange resin for the separation or concentration of a positively charged materials or ions. That is, the sulfonyl-containing polymeric material functions as a cation exchange resin. Positively charged materials tend to be retained longer by the sulfonyl-containing polymeric material than neutral materials or negatively charged materials or ions. Further, positively charged materials or ions with a greater positive charge (e.g., calcium ions) tend to be retained longer by the sulfonyl-containing polymeric material than positively charged materials or ions with a lower positive charge (e.g., sodium ions). In some embodiments, the pH conditions during separation are selected so that the sulfonyl-containing polymeric material is negatively charged.

In other embodiments, the sulfonyl-containing polymeric material has —SO$_2$NH$_2$ or —SO$_2$NR$^6$-Q-N(R$^6$)$_2$ groups or a salt thereof and can be used as an ion exchange resin for the separation or concentration of negatively charged materials or ions. That is, the sulfonyl-containing polymeric material functions as an anion exchange resin. Negatively charged materials tend to be retained longer by the sulfonyl-containing polymeric material than neutral materials or positively charged materials or ions. Further, negatively charged materials or ions with a greater negative charge (e.g., phosphate ions) tend to be retained longer by the sulfonyl-containing polymeric material than negatively charged materials or ions with lower negative charge (e.g., nitrate ions). In some embodiments, the pH conditions during separation are selected so that the sulfonyl-containing polymeric material is positively charged.

The ion exchange resins can be placed within a chromatographic column. The ion exchange resins can be used for analytical purposes, for separation of impurities from a desired material, or for concentration of the desired material.

Unlike polymers prepared according to Reaction Scheme A and as further described in U.S. Pat. No. 7,690,514 (McKeown et al.), the polymeric materials prepared from a monomer of Formula (I) are crosslinked. Thus, the sulfonyl-containing polymeric material prepared using the monomers of Formula (I) tend to swell less when placed into an organic solvent or aqueous medium. This may be desirable for some applications where a dimensional change may be undesirable when contacted with a solvent.

Various embodiments are provided of sulfonyl-containing polymeric materials and methods of making the sulfonyl-containing polymeric materials.

Embodiment 1 is a sulfonyl-containing polymeric material that includes the reaction product of a reaction mixture containing a) a precursor polymeric material and b) a sulfonyl-containing compound. The precursor polymeric material includes a polymerized product of a polymerizable composition containing a monomer of Formula (I).

In Formula (I), each R$^1$ is hydrogen, halo, alkyl, aryl, alkaryl, or aralkyl, wherein at least one R$^1$ is hydrogen. Each R$^2$ is independently hydrogen, alkyl, aryl, alkaryl, aralkyl, combines with a R$^3$ connected to a same carbon atom to form a cyclic alkyl, or combines with a R$^3$ connected to the same carbon atom to form a cyclic alkyl that is fused to one or more carbocyclic rings. Each R$^3$ is independently hydrogen, alkyl, aryl, alkaryl, aralkyl, combines with a R$^2$ connected to a same carbon atom to form a cyclic alkyl, combines with a R$^2$ connected to the same carbon atom to form a cyclic alkyl that is fused to one or more carbocyclic rings, or combines with R$^4$ connected to an adjacent carbon atom to form a carbon-carbon bond. Each R$^4$ is independently hydrogen or combines with R$^3$ connected to the adjacent carbon atom to form a carbon-carbon bond. The sulfonyl-containing polymeric material has at least one group of formula
—SO$_2$R$^5$ and up to a maximum of one group of formula —SO$_2$R$^5$ for each aromatic ring in the sulfonyl-containing polymeric material. The group R$^5$ is —OH, —NH$_2$, or —N(R$^6$)-Q-N(R$^6$)$_2$. The group Q is a single bond, alkylene, or a group of formula -(Q$^1$-NR$^6$)$_x$-Q$^2$- where each Q$^1$ and Q$^2$ is independently an alkylene and where x is an integer in a range of 1 to 4. Each group R$^6$ is independently hydrogen or alkyl.

Embodiment 2 is the sulfonyl-containing polymeric material of embodiment 1, wherein each R$^1$ is hydrogen or halo.

Embodiment 3 is the sulfonyl-containing polymeric material of embodiment 1 or 2, wherein each R$^2$ and each R$^3$ are alkyl.

Embodiment 4 is the sulfonyl-containing polymeric material of any one of embodiments 1 to 3, wherein R$^4$ is hydrogen.

Embodiment 5 is the sulfonyl-containing polymeric material of any one of embodiments 1 to 4, wherein the compound of Formula (I) is 3,3,3',3'-tetramethyl-1,1'-spirobis-indan-6,6'-divinyl.

Embodiment 6 is the sulfonyl-containing polymeric material of any one of embodiments 1 to 5, wherein the polymerizable composition further comprises a polyvinyl aromatic monomer or a polyvinyl aromatic monomer substituted with one or more alkyl groups.

Embodiment 7 is the sulfonyl-containing polymeric material of embodiment 6, wherein the polyvinyl aromatic monomer is divinylbenzene, trivinylbenzene, divinylbenzene substituted with one or more alkyl groups, or trivinylbezene substituted with one or more alkyl groups.

Embodiment 8 is the sulfonyl-containing polymeric material of any one of embodiments 1 to 7, wherein the polymerizable composition optionally further comprises up to 25 weight percent of a mono-vinyl aromatic monomer or a mono-vinyl aromatic monomer substituted with one or more alkyl groups, wherein the weight percent is based on a total weight of monomers in the polymerizable composition.

Embodiment 9 is the sulfonyl-containing polymeric material of embodiment 8, wherein the polymerizable composition comprises the 1 to 99 weight percent monomer of Formula (I), 0 to 25 weight percent mono-vinyl aromatic monomer, and 1 to 99 weight percent polyvinyl aromatic monomer, wherein the weight percents are based on a total weight of monomers in the polymerizable composition.

Embodiment 10 is the sulfonyl-containing polymeric material of embodiment 8, wherein the polymerizable composition comprises 40 to 99 weight percent monomer of Formula (I), 0 to 15 weight percent mono-vinyl aromatic monomer, and 1 to 60 weight percent polyvinyl aromatic monomer, wherein the weight percents are based on a total weight of monomers in the polymerizable composition.

Embodiment 11 is the sulfonyl-containing polymeric material of any one of embodiments 1 to 10, wherein the sulfonyl-containing polymer is in a form of particles or beads.

Embodiment 12 is the sulfonyl-containing polymeric material of any one of embodiments 1 to 11, wherein the sulfonyl-containing group is —$SO_2OH$ or a salt thereof.

Embodiment 13 is the sulfonyl-containing polymeric material of embodiment 12, wherein the sulfonyl-containing polymeric material is a cation exchange resin.

Embodiment 14 is the sulfonyl-containing polymeric material of any one of embodiments 1 to 11, wherein the sulfonyl-containing group is —$SO_2NH_2$, —$SO_2NR^6$-Q-N$(R^6)_2$, or a salt thereof.

Embodiment 15 is the sulfonyl-containing polymeric material of embodiment 14, wherein the sulfonyl-containing polymeric material is an anion exchange resin.

Embodiment 16 is the sulfonyl-containing polymeric material of any one of embodiments 1 to 15, wherein the sulfonyl-containing polymeric material is porous.

Embodiment 17 is the sulfonyl-containing polymeric material of embodiment 16, wherein the sulfonyl-containing polymeric material is microporous, mesoporous, or both.

Embodiment 18 is the sulfonyl-containing polymeric material of any one of embodiments 1 to 17, wherein the sulfonyl-containing polymeric material has the BET surface area equal to at least 100 $m^2$/gram.

Embodiment 19 is a method of making a sulfonyl-containing polymeric material. The method includes forming a polymerizable composition containing a monomer of Formula (I) as described above, preparing a precursor polymeric material by reacting the polymerizable composition and then treating the precursor polymeric material with a sulfonyl-containing compound to form the sulfonyl-containing polymeric material. The sulfonyl-containing polymeric material has at least one group of formula —$SO_2R^5$ and up to a maximum of one group of formula —$SO_2R^5$ for each aromatic ring in the sulfonyl-containing polymeric material. The group $R^5$ is the same as defined above.

Embodiment 20 is the method of embodiment 19, wherein each $R^1$ is hydrogen or halo.

Embodiment 21 is the method of embodiment 19 or 20, wherein each $R^2$ and each $R^3$ are alkyl.

Embodiment 22 is the method of any one of embodiments 19 to 21, wherein $R^4$ is hydrogen.

Embodiment 23 is the method of any one of embodiments 19 to 22, wherein the compound of Formula (I) is 3,3,3',3'-tetramethyl-1,1'-spirobisindan-6,6'-divinyl.

Embodiment 24 is the method of any one of embodiments 19 to 23, wherein the polymerizable composition further comprises a polyvinyl aromatic monomer or a polyvinyl aromatic monomer substituted with one or more alkyl groups.

Embodiment 25 is the method of embodiment 24, wherein the polyvinyl aromatic monomer is divinylbenzene, trivinylbenzene, divinylbenzene substituted with one or more alkyl groups, or trivinylbezene substituted with one or more alkyl groups.

Embodiment 26 is the method of any one of embodiments 19 to 25, wherein the polymerizable composition optionally further comprises up to 25 weight percent of a mono-vinyl aromatic monomer or a mono-vinyl aromatic monomer substituted with one or more alkyl groups, wherein the weight percent is based on a total weight of monomers in the polymerizable composition.

Embodiment 27 is the method of embodiment 26, wherein the polymerizable composition comprises the 1 to 99 weight percent monomer of Formula (I), 0 to 25 weight percent mono-vinyl aromatic monomer, and 1 to 99 weight percent polyvinyl aromatic monomer, wherein the weight percents are based on a total weight of monomers in the polymerizable composition.

Embodiment 28 is the method of embodiment 27, wherein the polymerizable composition comprises 40 to 99 weight percent monomer of Formula (I), 0 to 15 weight percent mono-vinyl aromatic monomer, and 1 to 60 weight percent polyvinyl aromatic monomer, wherein the weight percents are based on a total weight of monomers in the polymerizable composition.

Embodiment 29 is the method of any one of embodiments 19 to 28, wherein the sulfonyl-containing polymeric material is porous.

Embodiment 30 is the method of embodiment 29, wherein the sulfonyl-containing polymeric material is microporous, mesoporous, or both.

Embodiment 31 is the method of any one of embodiments 19 to 30, wherein the sulfonyl-containing polymeric material has the BET surface area equal to at least 100 $m^2$/gram.

Embodiment 32 is the method of any one of embodiments 19 to 31, wherein the sulfonyl-containing group is —$SO_2OH$ or a salt thereof.

Embodiment 33 is the method of embodiment 32, wherein the sulfonyl-containing polymeric material is a cation exchange resin.

Embodiment 34 is the method of any one of embodiments 19 to 31, wherein the sulfonyl-containing group is —$SO_2NH_2$, —$SO_2NR^6$-Q-N$(R^6)_2$, or a salt thereof.

Embodiment 35 is the method of embodiment 34, wherein the sulfonyl-containing polymeric material is an anion exchange resin.

Embodiment 36 is an ion exchange resin comprising the sulfonyl-containing polymeric material of embodiment 1.

Embodiment 37 is the ion exchange resin of embodiment 36, wherein the ion exchange resin is in a form of beads or particles.

Embodiment 38 is the ion exchange resin of embodiment 36 or 37, wherein the sulfonyl-containing group is —$SO_2OH$ or a salt thereof.

Embodiment 39 is the ion exchange resin of embodiment 36 or 37, wherein the sulfonyl-containing group is —$SO_2NH_2$, —$SO_2NR^6$-Q-N$(R^6)_2$, or a salt thereof.

Embodiment 40 is an article comprising a chromatographic column and the ion exchange resin of any one of embodiment 36 to 39 positioned within the chromatographic column.

EXAMPLES

TABLE 1

Glossary of materials

| Chemical Name | Chemical Supplier |
|---|---|
| 4,4'-Isopropylidene diphenol | Alfa Aesar, Ward Hill. MA |
| Methane sulfonic acid | Alfa Aesar, Ward Hill. MA |
| Methylene chloride | EMD Millipore Chemicals, Billerica, MA |
| Methanol | BDH Merck Ltd., Poole Dorset, UK |
| Pyridine | EM Science, Gibbstown, NJ |
| Trifluoromethane sulfonic acid | Oakwood Products, West Columbia, SC |
| Concentrated hydrogen chloride | EMD Millipore Chemicals, Billerica, MA |
| Sodium bicarbonate | J.T. Baker, Phillipsburg, NJ |
| Sodium sulfate | BDH Merck Ltd., Poole Dorset, UK |
| N,N-Dimethyl formamide | Sigma-Aldrich, Milwaukee, WI |
| Tributyl(vinyl)tin | Sigma-Aldrich, Milwaukee, WI |
| Lithium chloride | Mallinckrodt, St. Louis, MO |
| Bis(triphenylphosphine)palladium (II) chloride | Sigma-Aldrich, Milwaukee, WI |
| Diethyl ether | EMD Millipore Chemicals, Billerica, MA |
| Potassium fluoride | J.T. Baker, Phillipsburg, NJ |
| Ethyl acetate | EMD Millipore Chemicals, Billerica, MA |
| Petroleum ether | EMD Millipore Chemicals, Billerica, MA |
| Benzoyl peroxide | Sigma-Aldrich, Milwaukee, WI |
| Acetone-D6 | Cambridge Isotope Laboratories, Inc., Andover, MA |
| Chloroform-D | Cambridge Isotope Laboratories, Inc., Andover, MA |
| Silver sulfate | Alfa Aesar, Ward Hill. MA |
| Concentrated sulfuric acid | EMD Millipore Chemicals, Billerica, MA |
| Phenolphthalein | Sigma-Aldrich, Milwaukee, WI |
| Sodium hydroxide | EMD Millipore Chemicals, Billerica, MA |
| Azoisobutyronitrile | Sigma-Aldrich, Milwaukee, WI |
| Dimethyl 2,2'-azobis(2-methylpropionate) | Wako Pure Chemical Industries, Ltd., Osaka, Japan |
| Methyl ethyl ketone | J.T. Baker, Phillipsburg, NJ |
| Divinylbenzene (80% tech grade) | Sigma-Aldrich, Milwaukee, WI |
| Chlorosulfonic acid | Alfa Aesar, Ward Hill, MA |
| 1,2-Dichloroethane | EMD Millipore Chemicals, Billerica, MA |
| Concentrated ammonium hydroxide | EMD Millipore Chemicals, Billerica, MA |
| Hydrazine monohydrate | Alfa Aesar, Ward Hill, MA |
| Tetrahydrofuran | EMD Millipore Chemicals, Billerica, MA |

Gas Sorption Analysis:

Porosity and gas sorption experiments were performed using a Micromeritics Instrument Corporation (Norcross, Ga.) accelerated surface area and porosimetry (ASAP) 2020 system using adsorbates of ultra-high purity. The following is a typical method used for the characterization of the porosity within the exemplified materials. In a Micromeritics ½" diameter sample tube, 60-150 mg of material was heated at 150° C. under ultra-high vacuum (3-7 µmHg) for 2 hours on the analysis port of the ASAP 2020 to remove residual solvent and other adsorbates. (Examples 5 and 6 were heated at 70° C. for 6 hours and then 110° C. for 1 hour under ultra-high vacuum (3-7 µmHg) on the analysis port of the ASAP 2020 to remove residual solvent and other adsorbates.) Nitrogen sorption isotherms at 77 K were obtained using low pressure dosing (5 cm$^3$/g) at $p/p°<0.1$ and a pressure table of linearly spaced pressure points from $p/p°=0.1$-0.95. The method made use of the following equilibrium intervals: 90 seconds at $p/p°<10^{-5}$, 40 seconds at $p/p°=10^{-5}$-0.1, and 20 seconds at $p/p°>0.1$. Helium was used for the free space determination, after nitrogen sorption analysis, both at ambient temperature and at 77 K. Apparent surface areas were calculated from nitrogen adsorption data by multipoint BET analysis. Apparent micropore distributions were calculated from nitrogen adsorption data by DFT analysis using the standard nitrogen DFT model. Total pore volume was calculated from the total amount of nitrogen adsorbed at $p/p°=0.95$. Argon sorption isotherms at 77 K were obtained using low pressure dosing (5 cm$^3$/g) at $p/p°<0.1$ and a pressure table of linearly spaced pressure points from $p/p°=0.1$-0.95. The method made use of the following equilibrium intervals: 90 seconds at $p/p°<10^{-5}$, 40 seconds at $p/p°=10^{-5}$-0.1, and 20 seconds at $p/p°>0.1$. Helium was used for the free space determination, after argon sorption analysis, both at ambient temperature and at 77 K. Apparent surface areas were calculated from argon adsorption data by multipoint BET analysis. Apparent micropore distributions were calculated from argon adsorption data by DFT analysis using the argon at 77 K on carbon slit pores by NLDFT model. Total pore volume was calculated from the total amount of argon adsorbed at $p/p°=0.95$. BET, DFT and total pore volume analyses were performed using Micromeritics MicroActive Version 1.01 software.

Elemental Analysis:

Samples were analyzed for weight percent carbon, hydrogen, nitrogen and sulfur by combustion using a LECO TruSpec Micro CHNS elemental analyzer (LECO Corp, St. Joseph, Mich.). The samples were run in triplicate or better. Results are reported as the averages of replicate determinations. In order to eliminate ambient water from the analysis, aliquots of each sample were dried on a steam-plate under nitrogen for 2 hours and allowed to cool in a nitrogen purged dry-box for 30 minutes before weighing. The samples were placed in silver capsules and crimped and placed on the auto-sampler in ambient conditions.

The LECO TruSpec Micro CHNS instrument was calibrated by first base-lining the instrument with ambient air until the CHNS detectors are stabilized. Next, 3-4 empty crucibles were measured and set as instrument blanks. Finally, a calibration curve was generated with sulfamethazine as a standard. Based on this procedure the standard deviation for each element was: less than +/−0.5 weight percent for carbon, less than +/−0.3 weight percent for hydrogen, less than +/−0.3 weight percent for nitrogen and less than +/−0.3 weight percent for sulfur.

Procedure for Determination of Cationic Exchange Capacity by Liquid Titration:

The sulfonyl-containing polymeric material (about 0.200 grams) was suspended in 20 mL of deionized water. To this suspension was added 1 drop of a 1 percent by weight aqueous solution of phenolphthalein. This suspension was titrated with 0.1 M aqueous NaOH until a persistent pink color remained (phenolphthalein endpoint). The cationic exchange capacity was calculated based on the amount of NaOH needed to reach the titration endpoint.

Synthesis of 3,3,3',3'-tetramethyl-1,1'-spirobisindan-6,6'-diol (SBI-diol)

In a 5.0 L round bottomed flask, 1000.69 grams (4.38 moles) of 4,4'-isopropylidene diphenol (BPA) was melted. Once all of the BPA was melted, 50.51 grams (0.526 moles) of methane sulfonic acid was slowly added. The reaction mixture was stirred for 3 hours under a nitrogen atmosphere maintaining the temperature of the reaction mixture between 135-150° C. After 3 hours, while still hot, the molten reaction mixture was poured into 2.0 L of deionized water. A brown precipitate formed. The resulting precipitate was isolated by vacuum filtration and washed with 1.5 L of deionized water. The isolated solid was then put back in the 5.0 L round bottomed flask and 1.5 L of methylene chloride ($CH_2Cl_2$) was added. The solid was stirred in the $CH_2Cl_2$ at reflux for one hour. The flask was then allowed to cool to room temperature, and the flask was placed in a refrigerator (about 0° C.) overnight. The solid was then isolated by vacuum filtration and washed with a minimal amount (about 500 mL) of chilled $CH_2Cl_2$. The solid was then placed in a 4.0 L Erlenmeyer flask and dissolved in 900 mL of methanol (MeOH). To this solution was added 190 mL of $CH_2Cl_2$. The solution remained clear. The solution was stirred and 1.1 L of deionized water was added in portions. A white precipitate formed, and the mixture was placed in a refrigerator (about 0° C.) overnight. The solid was isolated by vacuum filtration and washed with a minimal amount (about 300 mL) of chilled $CH_2Cl_2$. The MeOH/$CH_2Cl_2$/$H_2O$ precipitation was repeated once more. The solid from the second precipitation was dried in a vacuum oven at 85° C. overnight to yield 214.77 grams (48% yield) of SBI-diol. $^1$H NMR (500 MHz, acetone-$d_6$) δ 7.85 (s, 2H), 7.02 (d, J=8.1 Hz, 2H), 6.68 (dd, J=8.1, 2.4 Hz, 2H), 6.19 (d, J=2.4 Hz, 2H), 2.32 (d, J=13.0 Hz, 2H), 2.19 (d, J=13.0 Hz, 2H), 1.35 (s, 6H), 1.29 (s, 6H).

Synthesis of perfluoromethane-1-sulfonic acid 6'-(perfluoromethane-1-sulfonyloxy)-3,3,3',3'-tetramethyl-1,1'-spirobisindane-6-yl ester (SBI-bistriflate)

In a 250 mL round bottomed flask, 5.0025 grams (16.2 mmoles) of SBI-diol and 4.755 mL (47.1 mmoles) of pyridine were dissolved in 150 mL of $CH_2Cl_2$. The flask was placed in an ice/water bath. To this solution was added dropwise 7.930 mL (58.8 mmoles) of trifluoromethane sulfonic anhydride (TFMSA). After the addition was complete, the flask was removed from the ice/water bath. The reaction mixture was stirred at room temperature under a nitrogen atmosphere for 1 hour. The reaction was stopped by adding 10 mL of aqueous HCl (10% by weight). The resulting mixture was partitioned between $CH_2Cl_2$ and a saturated aqueous solution of sodium bicarbonate ($NaHCO_3$). The organic layer was isolated, dried over anhydrous sodium sulfate ($Na_2SO_4$) and filtered. The filtrate was condensed under reduced pressure and dried under high vacuum at room temperature for 3 hours to remove any residual pyridine. The resulting tan solid (SBI-bistriflate) weighed 8.51 grams (92% yield). $^1$H NMR (500 MHz, CDCl$_3$) δ 7.17 (d, J=8.3 Hz, 2H), 7.08 (dd, J=8.3, 2.3 Hz, 2H), 6.55 (d, J=2.3 Hz, 2H), 2.26 (ABq, J=13.2 Hz, 4H), 1.34 (s, 6H), 1.29 (s, 6H). $^{19}$F NMR (470.5 MHz, CDCl$_3$) δ −73.0.

Synthesis of 3,3,3',3'-tetramethyl-1,1'-spirobisindan-6,6'-divinyl (SBI-DV)

In a 250 mL round bottomed flask, 5.0025 grams (8.74 mmoles) of SBI-bistriflate was dissolved in 75 mL of anhydrous N,N-dimethyl formamide (DMF). To this solution was added 6.125 mL (21.0 mmoles) of vinyl tributyltin and 22.2225 grams (52.4 mmoles) of lithium chloride (LiCl). The reaction mixture was stirred at room temperature under a nitrogen atmosphere for 5 minutes before adding 0.6140 grams (875 moles) of bis(triphenylphosphine)palladium (II) chloride. The reaction mixture was stirred at room temperature overnight under a nitrogen atmosphere. After reacting for 24 hours at room temperature, the reaction was stopped by pouring the reaction mixture into 150 mL of deionized water. A precipitate formed. The aqueous layer and precipitate were extracted with diethyl ether ($Et_2O$) (3×200 mL). The organic layers were combined. The organic layer was then stirred vigorously at room temperature with an equal volume of aqueous potassium fluoride (KF) (10 grams/100 mL) for 1 hour. A gray-white precipitate formed and the mixture was vacuum filtered. The filtrate was then placed back in a separatory funnel and the organic layer isolated. The organic layer was then dried over anhydrous $Na_2SO_4$, filtered and the filtrate was condensed under reduced pressure to yield a white solid. This solid was further purified by silica gel chromatography. The material was loaded onto a silica gel column (8×25 cm), and the column was eluted with 5% ethyl acetate (EtOAc)/95% petroleum ether (PE) (vol./vol.). Fractions containing the pure SBI-DV were combined, condensed under reduced pressure and dried under high vacuum at room temperature to yield 2.3822 grams (83% yield) of SBI-DV as a white solid. $^1$H NMR (500 MHz, CDCl$_3$) δ 7.34 (dd, J=7.9, 1.6 Hz, 2H), 7.17 (d, J=7.9 Hz, 2H), 6.85 (d, J=1.6 Hz, 2H), 6.64 (dd, J=17.6, 10.9 Hz, 2H), 5.62 (dd, J=17.6, 1.0 Hz, 2H), 5.12 (dd, J=10.9, 1.0 Hz, 2H), 2.32 (ABq, J=13.1 Hz, 4H), 1.42 (s, 6H), 1.36 (s, 6H).

Preparatory Example 1

A 0.9 milligrams/mL solution of AIBN was made by dissolving 17.3 milligrams of AIBN in 19.2 mL of EtOAc. In a 20 mL vial, 0.3002 grams (914 μmoles) of SBI-DV was dissolved in 6.0 mL of EtOAc. To this solution was added 2.0 mL of the AIBN/EtOAc solution. The polymerization mixture thus consisted of an EtOAc solution of SBI-DV at 4.0 percent solids and 0.6 weight percent AIBN (based on amount of SBI-DV). The polymerization mixture was bubbled with nitrogen for 10 minutes. The vial was then capped and placed in a sand bath at 90° C. The polymerization was heated at this elevated temperature for 16 hours. A white precipitate had formed and was isolated by vacuum filtration and washed with EtOAc. The solid was placed in a 20 mL vial and 10 mL of EtOAc was added to the vial. The vial was shaken on a wrist shaker for one hour at room temperature. The solid was again isolated by vacuum filtration and washed with EtOAc. The solid was placed in a 20 mL vial and 10 mL of EtOAc was added to the vial. The solid was shaken on a wrist shaker overnight. The solid was again isolated by vacuum filtration and washed with EtOAc. The solid was then dried under high vacuum at 90° C. overnight. This material had a $SA_{BET}$ (surface area calculated using the BET method) of 853.8 m$^2$/gram and total pore volume of 0.582 cm$^3$/gram (p/p°=0.950) as determined by nitrogen sorption.

Preparatory Example 2

A 5.0 milligrams/mL solution of BPO was made by dissolving 50.1 milligrams of BPO in 10 mL of EtOAc. In an 8 mL vial, 0.2000 grams (609 μmoles) of SBI-DV and 29 microliters (μL) (203 μmoles) of DVB (80%, tech grade) was dissolved in 1.437 mL of EtOAc. To this solution was added 906 μL of the BPO/EtOAc solution. The polymerization mixture thus consisted of an EtOAc solution of SBI-DV/DVB in a 3:1 molar ratio at 9.6 percent solids and 2 weight percent BPO (based on amount of SBI-DV and DVB). The polymerization mixture was bubbled with nitrogen for 10 minutes. The vial was then capped and placed in a sand bath at 80° C. The polymerization was heated at this elevated temperature for 17 hours. A white precipitate had formed and was isolated by vacuum filtration and washed with EtOAc. The solid was placed in a 20 mL vial and 10 mL of EtOAc was added to the vial. The vial was shaken on a wrist shaker for one hour at room temperature. The solid was again isolated by vacuum filtration and washed with EtOAc. The solid was placed in a 20 mL vial and 10 mL of EtOAc was added to the vial. The solid was shaken on a wrist shaker overnight. The solid was again isolated by vacuum filtration and washed with EtOAc. The solid was then dried under high vacuum at 110° C. overnight. This material had a $SA_{BET}$ of 739.7 m$^2$/gram and total pore volume of 0.690 cm$^3$/gram (p/p°=0.950) as determined by nitrogen sorption.

Preparatory Example 3

A 5.0 milligrams/mL solution of BPO was made by dissolving 50.1 milligrams of BPO in 10 mL of EtOAc. In an 8 mL vial, 0.2000 grams (609 µmoles) of SBI-DV and 87 µL (609 µmoles) of DVB (80%, tech grade) was dissolved in 2.452 mL of EtOAc. To this solution was added 1.117 µL of the BPO/EtOAc solution. The polymerization mixture thus consisted of an EtOAc solution of SBI-DV/DVB in a 1:1 molar ratio at 8.0 percent solids and 2 weight percent BPO (based on amount of SBI-DV and DVB). The polymerization mixture was bubbled with nitrogen for 10 minutes. The vial was then capped and placed in a sand bath at 80° C. The polymerization was heated at this elevated temperature for 17 hours. A white precipitate had formed and was isolated by vacuum filtration and washed with EtOAc. The solid was placed in a 20 mL vial and 10 mL of EtOAc was added to the vial. The vial was shaken on a wrist shaker for one hour at room temperature. The solid was again isolated by vacuum filtration and washed with EtOAc. The solid was placed in a 20 mL vial and 10 mL of EtOAc was added to the vial. The solid was shaken on a wrist shaker overnight. The solid was again isolated by vacuum filtration and washed with EtOAc. The solid was then dried under high vacuum at 110° C. overnight. This material had a $SA_{BET}$ of 810.1 m$^2$/grams and total pore volume of 0.848 cm$^3$/grams (p/p°=0.950) as determined by nitrogen sorption.

Preparatory Example 4

In a 40 mL vial, 0.3011 grams (917 moles) of SBI-DV and 395 µL (2.72 mmoles) of DVB (80%, tech grade) was dissolved in 17.6 mL of EtOAc. To this solution was added 13.0 milligrams of BPO. The polymerization mixture thus consisted of an EtOAc solution of SBI-DV/DVB in a 1:3 molar ratio at 3.6 percent solids and 2 weight percent BPO (based on amount of SBI-DV and DVB). The polymerization mixture was bubbled with nitrogen for 10 minutes. The vial was then capped and placed in a sand bath at 80° C. The polymerization was heated at this elevated temperature for 17 hours. A white precipitate had formed and was isolated by vacuum filtration and washed with EtOAc. The solid was placed in a 20 mL vial and 10 mL of EtOAc was added to the vial. The vial was shaken on a wrist shaker for one hour at room temperature. The solid was again isolated by vacuum filtration and washed with EtOAc. The solid was placed in a 20 mL vial and 10 mL of EtOAc was added to the vial. The solid was shaken on a wrist shaker overnight. The solid was again isolated by vacuum filtration and washed with EtOAc. The solid was then dried under high vacuum at 110° C. overnight. This material had a $SA_{BET}$ of 890.2 m$^2$/gram and total pore volume of 0.868 cm$^3$/gram (p/p°=0.951) as determined by nitrogen sorption. This material also had a $SA_{BET}$ of 854.1 m$^2$/gram and total pore volume of 0.657 cm$^3$/gram (p/p°=0.951) as determined by argon sorption.

Example 1

A chlorosulfonic acid/1,2-dichloroethane (DCE) solution was prepared by adding 2.7 mL of chlorosulfonic acid to 14 mL of DCE which was cooled to 0° C. in an ice/water bath. This solution was added to a 40 mL vial containing 0.2330 grams of the material produced in Preparatory Example 1 (SBI-DV homopolymer) with the vial submerged in a ice/water bath. After 5 minutes at 0° C., the capped vial was removed from the ice bath and placed in a sand bath at 85° C. After 18 hours at this elevated temperature, the reaction was stopped by isolating the solid polymeric material by vacuum filtration. The solid was washed twice with 20 mL of $CH_2Cl_2$. The solid was then placed in a 20 mL vial containing 15 mL of deionized water. The material was allowed to stand in the water at room temperature for 1 hour. The solid was then isolated again by vacuum filtration and washed with water until the pH of the water washes was about 5. The solid was then dried under high vacuum at 80° C. overnight. The acid equivalents of this material, as determined by elemental analysis based on weight percent sulfur, was 4.10 mmoles/gram. The acid equivalents for this material, as measured by liquid titration, was 3.14 mmoles/gram.

Example 2

A chlorosulfonic acid/DCE solution was prepared by adding 2.7 mL of chlorosulfonic acid to 14 mL of DCE which was cooled to 0° C. in an ice/water bath. This solution was added to a 40 mL vial containing 0.1694 grams of the material produced in Preparatory Example 2 (SBI-DV/DVB 3:1 molar ratio copolymer) with the vial submerged in a ice/water bath. After 5 minutes at 0° C., the capped vial was removed from the ice bath and placed in a sand bath at 85° C. After 18 hours at this elevated temperature, the reaction was stopped by isolating the solid polymeric material by vacuum filtration. The solid was washed twice with 20 mL of $CH_2Cl_2$. The solid was then placed in a 20 mL vial containing 15 mL of deionized water. The material was allowed to stand in the water at room temperature for 1 hour. The solid was then isolated again by vacuum filtration and washed with water until the pH of the water washes was about 5. The solid was then dried under high vacuum at 80° C. overnight. The acid equivalents of this material, as determined by elemental analysis based on weight percent sulfur, was 4.13 mmoles/gram. The acid equivalents for this material, as measured by liquid titration, was 4.08 mmoles/gram.

Example 3

A chlorosulfonic acid/DCE solution was prepared by adding 2.7 mL of chlorosulfonic acid to 14 mL of DCE which was cooled to 0° C. in an ice/water bath. This solution was added to a 40 mL vial containing 0.1932 grams of the material produced in Preparatory Example 3 (SBI-DV/DVB 1:1 molar ratio copolymer) with the vial submerged in a ice/water bath. After 5 minutes at 0° C., the capped vial was removed from the ice bath and placed in a sand bath at 85° C. After 18 hours at this elevated temperature, the reaction was stopped by isolating the solid polymeric material by vacuum filtration. The solid was washed twice with 20 mL of $CH_2Cl_2$. The solid was then placed in a 20 mL vial containing 15 mL of deionized water. The material was allowed to stand in the water at room temperature for 1 hour. The solid was then isolated again by vacuum filtration and washed with water until the pH of the water washes was about 5. The solid was then dried under high vacuum at 80° C. overnight. The acid equivalents of this material, as determined by elemental analysis based on weight percent sulfur, was 4.03 mmoles/gram. The acid equivalents for this material, as measured by liquid titration, was 3.87 mmoles/gram.

Example 4

A chlorosulfonic acid/DCE solution was prepared by adding 2.7 mL of chlorosulfonic acid to 14 mL of DCE which was cooled to 0° C. in an ice/water bath. This solution was added to a 40 mL vial containing 0.2129 grams of the material produced in Preparatory Example 4 (SBI-DV/DVB 1:3 molar ratio copolymer) with the vial submerged in a ice/water bath. After 5 minutes at 0° C., the capped vial was removed from the ice bath and placed in a sand bath at 85° C. After 18 hours at this elevated temperature, the reaction was stopped by isolating the solid polymeric material by vacuum filtration. The solid was washed twice with 20 mL of $CH_2Cl_2$. The solid was then placed in a 20 mL vial containing 15 mL of deionized water. The material was allowed to stand in the water at room temperature for 1 hour. The solid was then isolated again by vacuum filtration and washed with water until the pH of the water washes was about 5. The solid was then dried under high vacuum at 80° C. overnight. The acid equivalents of this material, as determined by elemental analysis based on weight percent sulfur, was 3.95 mmoles/gram. The acid equivalents for this material, as measured by liquid titration, was 3.57 mmoles/gram. This material had a $SA_{BET}$ of 494.1 m²/gram and total pore volume of 0.397 cm³/gram (p/p°=0.952) as determined by argon sorption.

Example 5

A chlorosulfonic acid/DCE solution was prepared by adding 2.3 mL of chlorosulfonic acid to 12 mL of DCE which was cooled to 0° C. in an ice/water bath. This solution was added to a 20 mL vial containing 0.190 grams of the material produced in Preparatory Example 4 (SBI-DV/DVB 1:3 molar ratio copolymer) with the vial submerged in a ice/water bath. After 5 minutes at 0° C., the capped vial was removed from the ice bath and placed in a sand bath at 90° C. After 18 hours at this elevated temperature, the reaction was stopped by isolating the solid polymeric material by vacuum filtration. The solid was washed twice with 20 mL of $CH_2Cl_2$.

The resulting solid was then placed in a 20 mL vial containing an aqueous ammonium hydroxide solution prepared by adding 1.7 mL of concentrated ammonium hydroxide to 5 mL of deionized water. The vial was capped and shook, using a wrist shaker, overnight at room temperature. The reaction was stopped by isolating the solid polymeric material by vacuum filtration. The solid was washed with deionized water until the pH of the filtrate was about 8. The solid was then dried under high vacuum at 70° C. overnight. The functional group equivalents of this material were determined by elemental analysis based on weight percent sulfur to be 3.56 mmoles/gram and based on weight percent nitrogen to be 3.56 mmoles/gram. This material had a $SA_{BET}$ of 462.0 m²/gram and total pore volume of 0.365 cm³/gram (p/p°=0.951) as determined by argon sorption.

Example 6

A chlorosulfonic acid/DCE solution was prepared by adding 2.3 mL of chlorosulfonic acid to 12 mL of DCE which was cooled to 0° C. in an ice/water bath. This solution was added to a 20 mL vial containing 0.210 grams of the material produced in Preparatory Example 4 (SBI-DV/DVB 1:3 molar ratio copolymer) with the vial submerged in a ice/water bath. After 5 minutes at 0° C., the capped vial was removed from the ice bath and placed in a sand bath at 90° C. After 18 hours at this elevated temperature, the reaction was stopped by isolating the solid polymeric material by vacuum filtration. The solid was washed twice with 20 mL of $CH_2Cl_2$.

The resulting solid was then placed in a 20 mL vial containing a hydrazine/tetrahydrofuran (THF) solution prepared by adding 1.2 mL of hydrazine monohydrate to 5 mL of THF. The vial was capped and shook, using a wrist shaker, overnight at room temperature. The reaction was stopped by isolating the solid polymeric material by vacuum filtration. The solid was washed with 50 mL of THF. The solid was then placed in a 20 mL vial with 10 mL of deionized water. The solid was allowed to stand in the water for 1 hour at room temperature. The solid was then isolated by vacuum filtration and washed with deionized water until the pH of the filtrate was about 8. The solid was then dried under high vacuum at 70° C. overnight. The functional group equivalents of this material were determined by elemental analysis based on weight percent sulfur to be 3.32 mmoles/gram and based on weight percent nitrogen to be 2.53 mmoles/grams. This material had a $SA_{BET}$ of 323.0 m²/gram and total pore volume of 0.277 cm³/gram (p/p°=0.950) as determined by argon sorption.

I claim:

1. A sulfonyl-containing polymeric material comprising a reaction product of a reaction mixture comprising:
   a) a precursor polymeric material comprising a polymerized product of a polymerizable composition comprising a monomer of Formula (I)

wherein
   each $R^1$ is hydrogen, halo, alkyl, aryl, alkaryl, or aralkyl, wherein at least one $R^1$ is hydrogen;
   each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings;

each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon double bond; and each $R^4$ is independently hydrogen or combines with $R^3$ connected to the adjacent carbon atom to form a carbon-carbon double bond; and b) a sulfonyl-containing compound, wherein the sulfonyl-containing polymeric material having at least one group of formula —$SO_2R^5$ and up to a maximum of one group of formula —$SO_2R^5$ for each aromatic ring in the sulfonyl-containing polymeric material;

$R^5$ is —OH, —$NH_2$, or —$NR^6$-Q-N($R^6$)$_2$;

each $R^6$ is independently hydrogen or alkyl;

Q is a single bond, alkylene, or a group of formula -($Q^1$-$NR^6$)$_x$-$Q^2$-;

each $Q^1$ is an alkylene;

$Q^2$ is an alkylene; and x is an integer in a range of 1 to 4.

2. The sulfonyl-containing polymeric material of claim 1, wherein each $R^1$ is hydrogen or halo.

3. The sulfonyl-containing polymeric material of claim 1, wherein each $R^2$ and each $R^3$ are alkyl.

4. The sulfonyl-containing polymeric material of claim 1, wherein $R^4$ is hydrogen.

5. The sulfonyl-containing polymeric material of claim 1, wherein the compound of Formula (I) is 3,3,3',3'-tetramethyl-1,1'-spirobisindan-6,6'-divinyl.

6. The sulfonyl-containing polymeric material of claim 1, wherein the polymerizable composition further comprises a polyvinyl aromatic monomer or a polyvinyl aromatic monomer substituted with one or more alkyl groups.

7. The sulfonyl-containing polymeric material of claim 1, wherein the polymerizable composition optionally further comprises up to 25 weight percent of a mono-vinyl aromatic monomer or a mono-vinyl aromatic monomer substituted with one or more alkyl groups, wherein the weight percent is based on a total weight of monomers in the polymerizable composition.

8. The sulfonyl-containing polymeric material of claim 7, wherein the polymerizable composition comprises the 1 to 99 weight percent monomer of Formula (I), 0 to 25 weight percent mono-vinyl aromatic monomer, and 1 to 99 weight percent polyvinyl aromatic monomer, wherein the weight percents are based on a total weight of monomers in the polymerizable composition.

9. The sulfonyl-containing polymeric material of claim 1, wherein the sulfonyl-containing polymeric material is in a form of particles or beads.

10. The sulfonyl-containing polymeric material of claim 1, wherein the sulfonyl-containing group is —$SO_2OH$ or a salt thereof.

11. The sulfonyl-containing polymeric material of claim 10, wherein the sulfonyl-containing polymeric material is a cation exchange resin.

12. The sulfonyl-containing polymeric material of claim 1, wherein the sulfonyl-containing group is —$SO_2NH_2$, —$SO_2NR^1$-Q-N($R^6$)$_2$, or a salt thereof.

13. The sulfonyl-containing polymeric material of claim 12, wherein the sulfonyl-containing polymeric material is an anion exchange resin.

14. The sulfonyl-containing polymeric material of claim 1, wherein the sulfonyl-containing polymeric material is porous.

15. A method of making a sulfonyl-containing polymeric material, the method comprising:

a) forming a polymerizable composition comprising a monomer of Formula (I)

wherein each $R^1$ is hydrogen, halo, alkyl, aryl, alkaryl, or aralkyl, wherein at least one $R^1$ is hydrogen;

each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings;

each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon double bond; and each $R^4$ is independently hydrogen or combines with $R^3$ connected to the adjacent carbon atom to form a carbon-carbon double bond; and b) preparing a precursor polymeric material by reacting the polymerizable composition;

c) treating the precursor polymeric material with a sulfonyl-containing compound to form the sulfonyl-containing polymeric material, wherein the sulfonyl-containing polymeric material having at least one group of formula —$SO_2R^5$ and up to a maximum of one group of formula —$SO_2R^5$ for each aromatic ring in the sulfonyl-containing polymeric material;

$R^5$ is —OH, —$NH_2$, or —N($R^6$)-Q-N($R^6$)$_2$;

each $R^6$ is independently hydrogen or alkyl;

Q is a single bond, alkylene, or a group of formula -($Q^1$-$NR^6$)$_x$-$Q^2$-;

each $Q^1$ is an alkylene;

$Q^2$ is an alkylene; and x is an integer in a range of 1 to 4.

* * * * *

UNITED STATES PATENT AND TRADEMARK OFFICE
CERTIFICATE OF CORRECTION

PATENT NO. : 9,919,304 B2
APPLICATION NO. : 14/889581
DATED : March 20, 2018
INVENTOR(S) : Michael S. Wendland It is certified that error appears in the above-identified patent and that said Letters Patent is hereby corrected as shown below:

In the Specification

Column 4
Line 29, delete "mircopores" and insert -- micropores --, therefor.

Column 12
Line 26, delete "2-methylproprionate" and insert -- 2-methylpropionate --, therefor.

Column 16
Lines 65-66, delete "milliquivalents" and insert -- milliequivalents --, therefor.

Column 23
Line 64, delete "(875 moles)" and insert -- (875 μmoles) --, therefor.

In the Claims

Column 29
Line 63, in Claim 12, delete "–SO$_2$NR$^1$-Q-N(R$^6$)$_2$," and insert -- –SO$_2$NR$^6$-Q-N(R$^6$)$_2$, --, therefor.

Signed and Sealed this
Eleventh Day of September, 2018

Andrei Iancu
*Director of the United States Patent and Trademark Office*